United States Patent
Ozbaysal et al.

(10) Patent No.: US 7,434,720 B2
(45) Date of Patent: Oct. 14, 2008

(54) GOLD/NICKEL/COPPER/TITANIUM BRAZING ALLOYS FOR BRAZING WC-CO TO TITANIUM ALLOYS

(75) Inventors: Kazim Ozbaysal, Cincinnati, OH (US); Shawn P. Riley, Cincinnati, OH (US)

(73) Assignee: General Electric Company, Schnectady, NY (US)

( * ) Notice: Subject to any disclaimer, the term of this patent is extended or adjusted under 35 U.S.C. 154(b) by 300 days.

(21) Appl. No.: 11/249,928

(22) Filed: Oct. 13, 2005

(65) Prior Publication Data

US 2007/0087218 A1    Apr. 19, 2007

(51) Int. Cl.
    *B23K 35/14*    (2006.01)
    *C22C 5/02*    (2006.01)

(52) U.S. Cl. .................. 228/245; 228/246; 228/56.3; 420/512; 420/469; 420/507

(58) Field of Classification Search ............ 228/245, 228/246, 56.3, 193; 148/23, 24, 25; 420/502, 420/503, 504, 469, 485, 486, 495, 507, 457, 420/492, 512, 479
See application file for complete search history.

(56) References Cited

U.S. PATENT DOCUMENTS

| | | | |
|---|---|---|---|
| 3,903,585 A * | 9/1975 | Kosteruk et al. ............ 228/121 |
| 4,029,479 A | 6/1977 | Parker |
| 4,040,822 A | 8/1977 | Stern |
| 4,252,562 A | 2/1981 | D'Silva |
| 4,431,465 A * | 2/1984 | Mizuhara et al. ............ 148/24 |
| 4,447,391 A | 5/1984 | Mizuhara |
| 4,448,605 A | 5/1984 | Mizuhara |
| 4,486,386 A | 12/1984 | Mizuhara |
| 4,604,328 A | 8/1986 | Mizuhara |
| 4,604,636 A | 8/1986 | Dalal |
| 4,606,978 A * | 8/1986 | Mizuhara ............ 428/606 |
| 4,606,982 A | 8/1986 | Nelson et al. |
| 4,690,876 A | 9/1987 | Mizuhara |
| 4,903,890 A | 2/1990 | Mizuhara |
| 4,938,922 A | 7/1990 | Mizuhara |
| 5,368,220 A | 11/1994 | Mizuhara et al. |
| 7,153,375 B2 * | 12/2006 | Weinstein ............ 148/430 |
| 2004/0256442 A1 * | 12/2004 | Gates et al. ............ 228/141.1 |

OTHER PUBLICATIONS

Web page www.coiningllc.com, by Coining of America, LLC regarding "Typical Alloys Table" (date of first publication unknown). Applicants admit the status of this publication as prior art for the limited purpose of examination of this application, but otherwise reserve the right to challenge the status of this publication as prior art.

Web page www.handyharmancanada.com, regarding "Brazing with Gold Filler Metals" (date of first publication unknown). Applicants admit the status of this publication as prior art for the limited purpose of examination of this application, but otherwise reserve the right to challenge the status of this publication as prior art.

Chuang, T.H. et al., "Brazing of Zirconia with AgCuTi and SnAgTi Active Filler Metals," *Metallurgical and Materials Transactions*, 31A, 6, pp. 1591-1597 (Jun. 2000).

Oda, Y. et al., "Effect of corrosion on the strength of soldered titanium and Ti-6Al-4V alloy," *Dental Materials*, pp. 167-172 (May 1996).

Vianco, P. et al., "Aging of Brazed Joints—Interface Reactions in Base Metal/Filler Metal Couples—Part 1: Low-Temperature Ag-Cu-Ti Filler Metal," *Welding Journal*, pp. 201-S-210-S (Oct. 2002).

Vianco, P. et al., Aging of Braze Joints: Interface Reactions in Base Metal/Filler Metal Couples, Part II: High-Temperature Au-Ni-Ti Braze Alloy, *Welding Journal*, pp. 256-S-264-S (Nov. 2002).

* cited by examiner

*Primary Examiner*—Kevin P Kerns
*Assistant Examiner*—Michael Aboagye
(74) *Attorney, Agent, or Firm*—Marcella R. Louke; William Scott Andes

(57) ABSTRACT

A brazing material including about 20 to about 60 percent by weight gold, about 6 to about 16 percent by weight nickel, about 16 to about 60 percent by weight copper and about 6 to about 16 percent by weight titanium.

13 Claims, No Drawings

GOLD/NICKEL/COPPER/TITANIUM BRAZING ALLOYS FOR BRAZING WC-CO TO TITANIUM ALLOYS

BACKGROUND OF THE INVENTION

The present invention relates to brazing alloys and, more particularly, to brazing alloys for brazing tungsten carbide-cobalt composites to titanium alloys.

Tungsten carbide-cobalt materials (herein WC—Co) often are used to make various parts and components for aircraft engine applications due to the high mechanical strength, hardness, corrosion resistance and wear resistance of WC—Co. For example, wear resistant carboloy pads used in aircraft engines typically are constructed from (90-98 wt %) WC and (2-10 wt %) Co mixtures. The WC—Co carboloy pads typically are brazed to fan and compressor blade midspan shrouds for wear applications in aircraft engines. These blades typically are made of Ti 6Al-4V and/or Ti 8Al-1V-1Mo alloys with beta transus temperatures at or slightly above 1800° F.

In the prior art, titanium/copper/nickel braze alloys (herein TiCuNi), such as Ti-15Cu-15Ni, have been used to braze carboloy pads to titanium alloy blade midspan shrouds. TiCuNi braze foils have also been used for brazing WC—Co to titanium alloys since TiCuNi is the main braze alloy for brazing of titanium alloys with good strength and ductility. However, TiCuNi alloys have presented various impact failure problems when used in applications involving the brazing of WC—Co to titanium alloys, including chipping and fracturing at the braze joint when the brazed pads are subjected to an impact force (e.g., collision with a bird, an adjacent blade or various debris).

It has been found that the braze impact failures may be attributed to the low ductility brittle braze joints formed when brazing WC—Co to titanium alloys using TiCuNi brazing alloys. In particular, it has been found that tungsten and cobalt from the carboloy pad dissolves into the braze joint when the TiCuNi brazing material is in the molten state, thereby forming a low ductility, high hardness (e.g., about 1200 KHN) W—Co—Ti—Cu—Ni alloy braze interface. The braze interface exhibits cracking at impact energies as low as 0.30 joules and the carboloy pad is liberated from the substrate at the brittle braze interface at an impact energy of 0.60 joules.

Thus, TiCuNi braze alloys that have been successfully used for brazing of titanium to titanium alloys cannot be used for brazing of WC—Co to titanium alloys where impact resistance is required.

Industrially available braze alloys have been unable to meet the combined demands of low braze temperatures (i.e., below 1800° F.), high ductility and low cost necessary for aircraft engine applications. For example, Nioro (Au 82% and Ni 18%) and Nicoro80 (Au 81.5%, Cu 16.5% and Ni 2%) are heavy in gold and light in copper and therefore are expensive and have poor wetting properties and ductility. Furthermore, alloys incorporating Au 35%, Cu 62% and Ni 3% have liquidus temperatures at or above 1886° F., which is not applicable for brazing WC—Co to titanium alloys.

Accordingly, there is a need for ductile, impact resistant brazing alloys with brazing temperatures below the beta transus temperature of the substrate titanium alloy. In particular, there is a need for brazing alloys for brazing WC—Co materials to titanium alloys without forming a brittle braze interface.

BRIEF DESCRIPTION OF THE INVENTION

In one aspect, a brazing material is provided, wherein the brazing material includes about 20 to about 60 percent by weight gold, about 6 to about 16 percent by weight nickel, about 16 to about 60 percent by weight copper and about 6 to about 16 percent by weight titanium.

In another aspect, a brazing material is provided, wherein the brazing material includes about 29 percent by weight gold, about 8 percent by weight nickel, about 55 percent by weight copper and about 8 percent by weight titanium.

In another aspect, a brazing material is provided, wherein the brazing material includes about 49 percent by weight gold, about 14 percent by weight nickel, about 25 percent by weight copper and about 11 percent by weight titanium.

In another aspect, a brazing material is provided, wherein the brazing material consists essentially of gold, nickel, copper and titanium, wherein the gold, nickel, copper and titanium are present in amounts sufficient to provide the brazing material with a brazing temperature of about 1750° F. to about 1800° F. and a braze joint hardness of about 450 to about 600 KHN.

In another aspect, a method for brazing a first substrate to a second substrate is provided. The method includes the steps of positioning a brazing material between the first substrate and the second substrate, wherein the brazing material includes about 20 to about 60 percent by weight gold, about 6 to about 16 percent by weight nickel, about 16 to about 60 percent by weight copper and about 6 to about 16 percent by weight titanium, and raising the temperature of the brazing material to about 1750 to about 1800° F. for at least about 1 minute.

Other aspects of the present invention will become apparent from the following detailed description and the appended claims.

DETAILED DESCRIPTION OF THE INVENTION

The present invention is directed to Au (20 to 60 wt %), Ni (6 to 16 wt %), Cu (16 to 60 wt %) and Ti (6 to 16 wt %) alloys for brazing a first substrate to a second substrate (e.g., WC—Co materials to titanium alloys) at brazing temperatures generally below 1800° F., thereby preventing damage to the mechanical properties of the substrates whose beta transus temperatures are at or above 1800° F. In particular, the alloys of the present invention have a nickel content that is sufficiently high to ensure wettability to both WC—Co and titanium substrates, a copper content that is sufficiently high to ensure ductility for impact resistance, a gold content that is reasonably low to ensure adequate cost and a titanium content that is sufficient to provide strength without brittleness.

In one aspect, the brazing alloys of the present invention include about 20 to about 60 percent by weight gold, about 6 to about 16 percent by weight nickel, about 16 to about 60 percent by weight copper and about 6 to about 16 percent by weight titanium.

In another aspect, the brazing alloys of the present invention include about 29 percent by weight gold, about 8 percent by weight nickel, about 55 percent by weight copper and about 8 percent by weight titanium.

In another aspect, the brazing alloys of the present invention include about 49 percent by weight gold, about 14 percent by weight nickel, about 25 percent by weight copper and about 11 percent by weight titanium.

In another aspect, the weight percentages of gold, nickel, copper and titanium in the brazing alloys of the present invention may be selected based upon the intended use of the brazing alloy. In particular, the weight percentages may be selected such that the resulting brazing alloy has high impact resistance and ductility (i.e., low hardness) after brazing (i.e., post-braze) and melts below the beta transus temperature of the substrate being brazed such that the mechanical properties of the substrate are not negatively affected (e.g., by way of phase transformations) by high brazing temperatures.

The brazing alloys of the present invention may be provided in various forms. In one aspect, the brazing alloys may be provided as a homogeneous composition including gold, nickel, copper and titanium. In another aspect, the brazing alloys may be provided as powders. In another aspect, the brazing alloys may be provided as layered or laminated films or foils.

In the powdered form, the brazing alloys may be provided as mixtures of gold, nickel, copper and titanium powders and/or powders of alloys of one or more of gold, nickel, copper and titanium, wherein the metals are present in the appropriate quantities. In one aspect, the powders may not form homogeneous alloys until the powders are heated to the appropriate melting/brazing temperature. For example, a brazing alloy according to the present invention may be provided as a dispersion of copper powder, gold/nickel/copper powder and titanium/nickel/copper powder.

In the layered form, gold, nickel, copper, titanium and alloys thereof may be provided in separate layers, thereby providing homogeneous alloys only after heating to the appropriate melting/brazing temperature. For example, a brazing alloy according to the present invention may be provided as a laminated film or a layered material, wherein a layer of copper is positioned between layers of gold/nickel/copper foil and titanium/nickel/copper foil.

At this point, those skilled in the art will appreciate that various combinations of metals and alloys and various numbers of layers are within the scope of the present invention. Furthermore, those skilled in the art will appreciate that the layered material according to the present invention may be used in its flat (i.e., planar) configuration or may be rolled up or folded prior to brazing.

EXAMPLE 1

A brazing material is prepared using copper foil sandwiched between a layer of gold/nickel foil and a layer of titanium/nickel/copper foil. The thickness of each layer is selected such that the resulting layered material includes about 29 wt % gold, about 8 wt % nickel, about 55 wt % copper and about 8 wt % titanium with respect to the total weight of the layered material. The resulting layered material has a brazing temperature of about 1775° F.

EXAMPLE 2

A brazing material is prepared using copper foil sandwiched between a layer of gold/nickel foil and a layer of titanium/nickel/copper foil. The thickness of each layer is selected such that the resulting layered material includes about 49 wt % gold, about 14 wt % nickel, about 25 wt % copper and about 11 wt % titanium with respect to the total weight of the layered material. The resulting layered material has a brazing temperature of about 1795° F.

EXAMPLE 3

The layered material of Example 1 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1800° F. by way of induction heating for about 10 minutes under vacuum (about $10^{-4}$ torr). After the assembly is allowed to cool, the braze joint has a hardness of about 520 KHN.

EXAMPLE 4

The layered material of Example 2 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1800° F. by way of induction heating for about 10 minutes under vacuum (about $10^{-4}$ torr). After the assembly is allowed to cool, the braze joint has a hardness of about 560 KHN.

Accordingly, the gold/nickeU copper/titanium brazing alloys of the present invention are ductile and impact resistant with respect to titanium/copper/nickel brazing alloys and exhibit excellent wetting when used to join various WC—Co materials to various titanium alloy.

Although the gold/nickel/copper/titanium brazing alloys of the present invention are described herein with respect to certain aspects, modifications may occur to those skilled in the art upon reading the specification. The present invention includes all such modifications and is limited only by the scope of the claims.

The invention claimed is:

1. A method for brazing a first substrate to a second substrate comprising the steps of:
   positioning a brazing material between said first substrate and said second substrate, wherein said brazing material includes about 20 to about 60 percent by weight gold, about 6 to about 16 percent by weight nickel, about 16 to about 60 percent by weight copper and about 6 to about 16 percent by weight titanium; and
   raising a temperature of said brazing material to about 1750 to about 1800° F. for at least about 1 minute.

2. The method of claim 1 wherein said brazing material is a powder.

3. The method of claim 1 wherein said brazing material is a layered material.

4. The method of claim 1 wherein said raising step is performed under a vacuum.

5. The method of claim 1 wherein said brazing material has the following composition: about 29 percent by weight gold, about 8 percent by weight nickel, about 55 percent by weight copper and about 8 percent by weight titanium.

6. The method of claim 1 wherein said brazing material has the following composition: about 49 percent by weight gold, about 14 percent by weight nickel, about 25 percent by weight copper and about 11 percent by weight titanium.

7. The method of claim 1 wherein said first substrate includes a tungsten/carbide/cobalt material and said second substrate includes titanium or alloys thereof.

8. The method of claim 7 wherein said tungsten/carbide/cobalt material includes about 2 to about 10 percent cobalt.

9. A method for brazing a first substrate to a second substrate comprising the steps of:
   positioning a brazing material between said first substrate including a tungsten/carbide cobalt material and said second substrate including titanium or alloys thereof, wherein said brazing material consists essentially of about 20 to about 60 percent by weight gold, about 6 to about 16 percent by weight nickel, about 16 to about 60 percent by weight copper, and about 6 to about 16 percent by weight titanium, wherein in the brazing material, the gold, nickel, copper and titanium are present in amount sufficient to provide the brazing material with a post-braze hardness of about 450 to about 600 KHN; and
   raising a temperature of said brazing material to about 1750 to about 1800° F. for at least about 1 minute.

10. The method of claim 9 wherein said brazing material has the following composition: about 29 percent by weight gold, about 8 percent by weight nickel, about 55 percent by weight copper and about 8 percent by weight titanium.

11. The method of claim 9 wherein said brazing material has the following composition: about 49 percent by weight gold, about 14 percent by weight nickel, about 25 percent by weight copper and about 11 percent by weight titanium.

12. The method of claim 9 wherein the brazing material is in a form selected from the group consisting of a homogeneous alloy, a powder, or a layered form.

13. The method of claim 9 wherein the brazing material is in a layered formed, wherein said layered form includes at least one combination selected from the group consisting of: at least one layer of copper foil and at least one layer of a gold/nickel/copper foil; at least one layer of copper foil and at least one layer of titanium/nickel/copper foil; and at least one layer of copper foil, at least one layer of gold/nickel/copper foil, and at least one layer of titanium/nickel/copper foil.

* * * * *